Sept. 11, 1934.  H. R. MACK  1,973,536
STRUCTURAL TOY
Filed Oct. 7, 1933
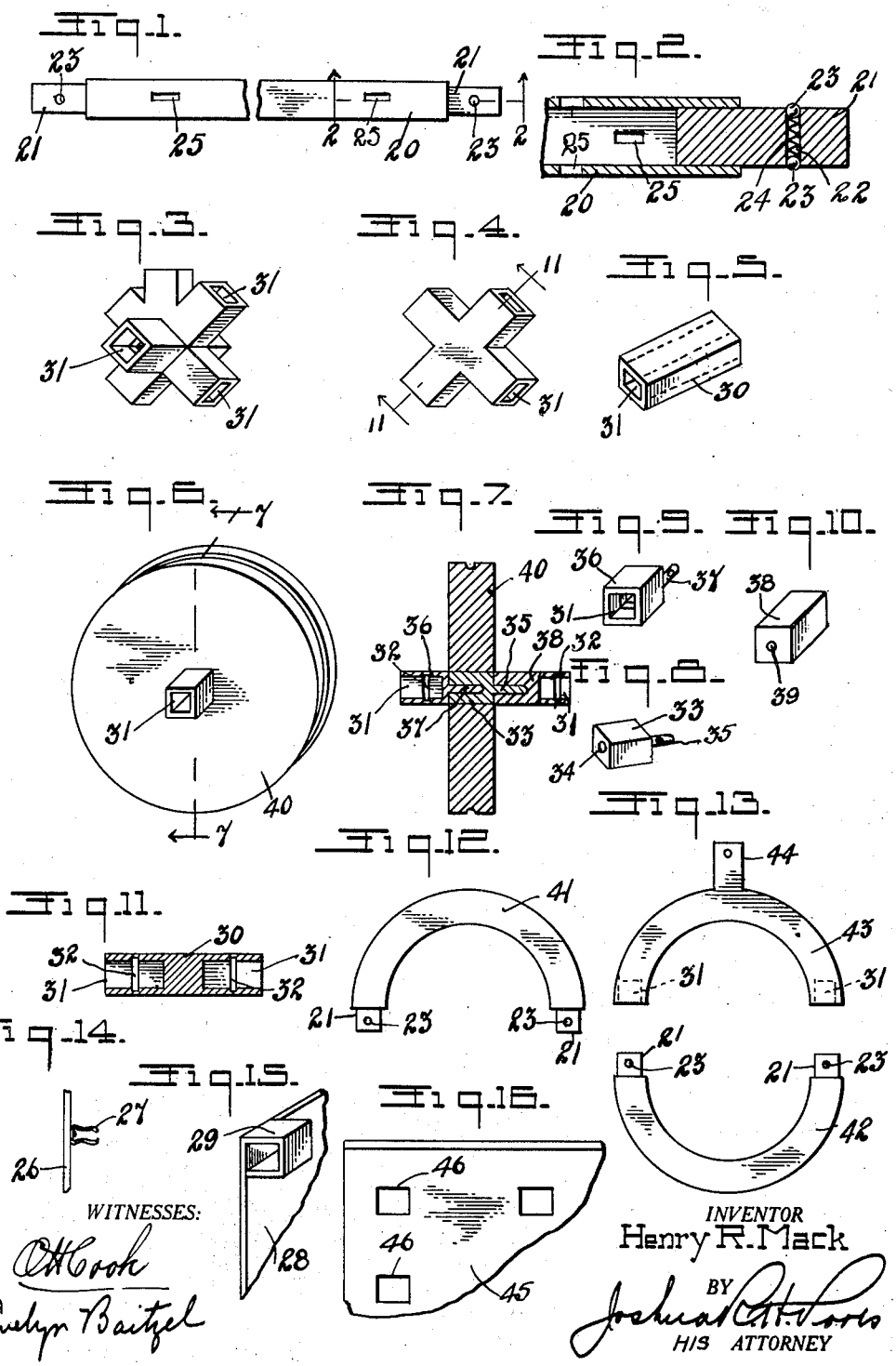
WITNESSES:
INVENTOR
Henry R. Mack
BY
HIS ATTORNEY Patented Sept. 11, 1934

1,973,536

UNITED STATES PATENT OFFICE 1,973,536

STRUCTURAL TOY

Henry R. Mack, Philadelphia, Pa.

Application October 7, 1933, Serial No. 692,636

8 Claims. (Cl. 46—35)

This invention relates to structural toys, and has for an object to provide a plurality of interacting and interconnecting units combined in a multitude of different relationships to form structures of various types and kinds.

A further object of the invention is to provide a bar with fittings for each end of the bar, said bar being of any approved or desired length, and the fittings of any of a great number of forms, so that other bars may be associated with the first-mentioned bars by connection with the fittings.

A further object of the invention is to provide fittings for coaction with the ends of bars, said fittings having sockets for receiving the ends of the bars, said sockets being arranged at predetermined angles relative to each other, determining thereby the angular relation of the associated bars.

A further object of the invention is to provide other units, such as wheels, curves, sheet material and the like, all of which may be associated with the bars and fittings in various positions and various relations for constructing various structural combinations.

The invention, therefore, comprises a great number of interacting and interconnectable units, some of which take the form of socket members and others of members coacting with the socket members, such as rods or the like and all provided in predetermined lengths or multiples or divisions thereof.

In the drawing,

Figure 1 is a view in side elevation of one of the bars broken to indicate that the bar may be of any desired length, Figure 2 is a sectional view through one type of bar, as indicated by line 2—2 at Figure 1, showing the bar as hollow with an end provided with latching mechanism, Figures 3, 4 and 5 are respectively perspective views of different types of fittings, Figure 6 is a view in perspective of a wheel which enters into the combination, Figure 7 is a diametrical section view through the wheel showing the association of the hub or bearing members therewith, Figure 8 is a perspective view of the hub member, Figure 9 is a perspective view of one of the members coacting with the hub, Figure 10 is a perspective view of another member coacting with the hub member shown at Figure 8, Figure 11 is a longitudinal sectional view through one type of fitting showing the grooves cooperating with the latch, Figure 12 is a view in side elevation of an arched rod, Figure 13 is a view in side elevation of the combination of an arched rod and an arched socket member for cooperating to form a complete circle, Figure 14 is a view in side elevation of a sheet of material provided with a spring member for associating with the several rods, Figure 15 is a view in perspective of a sheet of material having a sleeve formed thereon proportioned to slide onto one of the rods, and Figure 16 is a view in side elevation of a sheet of material having a plurality of sockets therein into any one or more of which the reduced ends of the rods may be inserted.

Like characters of reference indicate corresponding parts throughout the several views.

The present invention involves a great number of possible units, some of which are shown in the drawing merely by way of example. The rod 20, as shown at Figures 1 and 2, will preferably because of weight be made hollow with tenons 21 inserted and secured in the opposite ends of the rod. These rods 20 may be of any desired length, as indicated by the break at Figure 1. Preferably, however, a certain standard of length will be adopted and the rods will correspond to such length or to multiples or divisions of such length whereby all of said rods irrespective of their actual length may be made to cooperate in a completed structure.

The tenons 21 are preferably provided with transversely extending bores 22 with balls 23 pressed by the spring 24 to extend partially beyond the limits of the tenon.

Also, preferably these bars 20 will be provided with perforations 25 arranged in any frequency or order. At Figure 2 they are represented as staggered upon the proximate sides, but such arrangement is only illustrative. While these perforations 25 may be used for a multitude of purposes, a sheet of material 26, as shown at Figure 14, is contemplated having spring members 27 which may be inserted into these perforations 25 to form sides of structures, floors or the like.

Also, sheet of material shown at 28 in Figure 15 is provided with sleeves 29 which will be proportioned to receive the rods 20, and to be thereby suspended to form walls or other structural divisions.

For cooperation with the rods 20 and for maintaining their ends in united relation and at various angles, fittings will be provided employing sockets variously arranged at angles as found desirable. At Figure 5, a simple connecting member is shown at 30 having openings at opposite ends into which the tenons 21 may be inserted, thereby continuing the rods 20. The fitting 30 will be of the same transverse area as the rods 20, and when fitted upon the tenons will form continuations of such rods.

A simple cross is shown at Figure 4 having four sockets arranged in perpendicular relation, so that two or more of the rods may be inserted as found desirable to extend at right angles to each other.

At Figure 3 a more complex fitting is shown having sockets extending in various directions, some of which are arranged at angles of 90° and others at angles of 45°.

At Figure 11, a longitudinal sectional view is shown which might be a longitudinal section of the fitting shown at Figure 5, and is illustrative of all of the sockets employed in and about the present structural toy. The sockets are represented at 31 and each is provided with a groove or furrow 32 formed preferably entirely about the inner walls of the socket and in proper position to be engaged by the balls 23 when the tenon 21 is inserted into any of the sockets.

In certain structural organizations, wheels of various types are desirable. At Figures 6 and 7, the wheel is disclosed as a pulley, but it is to be understood that this is to cover any and all types of wheels, as for instance, traction wheels, gear wheels or any other wheels which may be employed. The wheel is provided with an axle socket through which the rod 20, or its equivalent, may be inserted. As shown at Figures 6 and 7, the hub member 33, shown also at Figure 8, is first inserted into the socket of the wheel. This hub member is provided with a cylindrical socket 34 and with a cylindrical spindle 35. A second unit 36 is provided having a spindle 37 fitting into the socket 34, and a third unit 38, shown at Figure 10, is provided with a socket 39 to receive the spindle 35. The members 36 and 38 are each provided with the sockets 31 into which the tenons 21 of the rods or other elements may be inserted. By this arrangement the wheel 40 is journaled rotating with the section 33 and relative to the sections 36 and 38.

At Figure 12 an arch 41 is disclosed. This arch will be of any size and arcature found desirable, and will be employed in and about the structural work for purposes of constructing arches or the like. The tenons 21 are the same as the tenons previously described, and will likewise coact with any of the fittings. The semi-circular member 42, shown at Figure 13, is intended for smaller work, and to cooperate with the semi-circular member 43, so that when the two are joined, a complete circle is provided. This is intended for bearings or the like, and will be made in any size that circumstances may dictate. The part 44 upon this semi-circular member 43 will be either the tenon or the socket as found desirable.

Under certain conditions, it is desirable to insert a number of rods into a single supporting plate or abutment, and at Figure 16, there is shown at 45, a fragmentary plate which is provided with a plurality of sockets 46 which will be similar to the other sockets, and into which the tenons of rods may be inserted, so that a number of rods may be positioned in several planes, as for instance, in positioning rods to form a floor or a wall, or a bridge, or other structural organization.

While any and all of the features illustrated are merely for illustrating purposes and without any limitation upon the invention, they do show a number of features which are and will be employed in any combination of units, but will be varied, added to or subtracted from, according to the completeness of the set.

It is obvious that very simple sets may be made up of but few of these elements, as shown or suggested, while more complete sets may include everything shown in the drawing, and many features only indicated by the examples thus disclosed.

I claim:—

1. A structural toy comprising a socket member, a member rotatably associated with said socket member, a wheel associated with said last-mentioned member, and a unit having a tenon properly proportioned for insertion into the socket member.

2. A structural toy comprising a socket member, a member transversely similar to and revolubly associated with the socket member, a wheel carried by one of said members, and a unit having revoluble connection with the wheel carrying member.

3. A structural toy comprising a socket member, a member transversely similar to and revolubly associated with the socket member in axial alignment, a wheel carried by one of said members, and a unit having revoluble connection with the wheel carrying member.

4. A structural toy comprising a socket member, a member transversely similar to and revolubly associated with the socket member, a wheel carried by one of said members, and a socketed unit having revoluble connection with the wheel carrying member.

5. A structural toy comprising a socket member, a member transversely similar to and revolubly associated with the socket member, a wheel carried by one of said members, a unit having revoluble connection with the wheel carrying member, and rods adapted to make aligned connection with the socket.

6. A structural toy comprising a socket member, a member transversely similar to and revolubly associated with the socket member, a wheel carried by one of said members, a socketed unit having revoluble connection with the wheel carrying member, and rods adapted to make aligned connection with both of said sockets.

7. A structural toy comprising a socket member, a member transversely similar to and revolubly associated with the socket member, a wheel carried by one of said members, a unit having revoluble connection with the wheel carrying member, and parts adapted for aligned connection with said socket member and said unit.

8. A structural toy comprising a socket member, a member transversely similar to and revolubly associated with the socket member in axial alignment, a wheel carried by one of said members, a socketed unit having revoluble connection with the wheel carrying member, and rods adapted for aligned connection with said socket member and said unit.

HENRY R. MACK.